(12) United States Patent
Stevenson et al.

(10) Patent No.: US 8,158,721 B2
(45) Date of Patent: Apr. 17, 2012

(54) PROCESS FOR PREPARING DYNAMICALLY VULCANIZED ALLOYS

(75) Inventors: William G. Stevenson, Uniontown, OH (US); Joseph M. DeLucia, Pittsburgh, PA (US); Michael K. Lyon, Houston, TX (US); Jianya Cheng, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 712 days.

(21) Appl. No.: 12/139,248

(22) Filed: Jun. 13, 2008

(65) Prior Publication Data

US 2009/0312458 A1      Dec. 17, 2009

(51) Int. Cl.
C08J 3/22      (2006.01)
C08J 3/24      (2006.01)
C08L 23/00    (2006.01)

(52) U.S. Cl. ............. 525/66; 525/74; 525/192; 525/197

(58) Field of Classification Search .................... 525/66, 525/178, 74, 192, 197
See application file for complete search history.

(56) References Cited

U.S. PATENT DOCUMENTS

| 4,594,390 | A | 6/1986 | Abdou-Sabet et al. |
| 5,244,972 | A | 9/1993 | Phadke |
| 7,169,849 | B2 | 1/2007 | Ikuji et al. |
| 7,275,574 | B2 | 10/2007 | Watanabe et al. |
| 7,291,667 | B2 | 11/2007 | Nasreddine et al. |
| 2004/0236032 | A1 | 11/2004 | Bacci et al. |
| 2006/0293454 | A1 | 12/2006 | Nadella et al. |
| 2006/0293457 | A1 | 12/2006 | Nadella et al. |
| 2007/0135571 | A1 | 6/2007 | Ellul et al. |

FOREIGN PATENT DOCUMENTS

| DE | 199 05 292 | 10/1999 |
| EP | 0344021 | 5/1989 |
| EP | 0969039 A1 | 1/1999 |
| EP | 1 362 681 | 11/2003 |
| JP | 11302455 A | 11/1999 |
| WO | WO 99/16600 | 4/1999 |
| WO | WO 2007/050071 | 5/2007 |
| WO | WO 2007/050076 | 5/2007 |
| WO | WO 2009-048472 | 4/2009 |

*Primary Examiner* — Jeffrey Mullis
(74) *Attorney, Agent, or Firm* — Nancy T. Krawczyk

(57) ABSTRACT

This invention relates to processes for the preparation of a dynamically vulcanized alloy comprising at least one isobutylene-containing elastomer and at least one thermoplastic resin. More specifically, the processes produce dynamically vulcanized alloys with unique morphological features which have good impermeability and low temperature flexibility.

13 Claims, 2 Drawing Sheets

PROCESS FOR PREPARING DYNAMICALLY VULCANIZED ALLOYS

FIELD OF THE INVENTION

The present invention relates generally to dynamically vulcanized alloys and processes for preparing dynamically vulcanized alloys.

BACKGROUND OF THE INVENTION

Various types of thermoplastic elastomer compositions are known and have found use in tire and other industrial rubber applications, as well as in other manufactured products.

One such thermoplastic elastomer composition comprises a low-permeability thermoplastic resin, such as polyamide or a blend of polyamides, in which there is dispersed a low-permeability rubber, such as butyl rubber, halobutyl rubbers, or brominated isobutylene para-methylstyrene copolymers. The rubber is cured under conditions of dynamic vulcanization (curing the rubber during melt mixing as opposed to static curing that typically occurs in a rubber mold) and is intimately and uniformly dispersed as a particulate phase within a continuous phase of the thermoplastic resin. Because the rubber is cured under shear mixing conditions, these compositions are commonly known as dynamically vulcanized alloys ("DVAs"). Typically, the shear mixing for achieving the thermoplastic elastomer is accomplished by a mixer, such as multi-screw extruders.

Shear mixing of the resin and rubber allows the composition to possess near thermoelastic properties. This thermoelastic nature is desired for the flexibility, strength, and elongation desired for tire innerliners. Such dynamically vulcanized compositions allow for an air impermeability that is greater than that of a conventional bromobutyl inner liner. Due to the increase impermeability of the dynamically vulcanized composition, the gauge of the innerliner material may be reduced. However, even with the composition exhibiting thermoelastic properties, the resin component of the composition is less flexible than the elastomeric component, and as operating temperatures to which the material is subjected is decreased, this reduced flexibility may lead to reduced low temperature fatigue resistance and cracking of the composition.

EP 0 969 039 A1 discloses that small particle size rubber dispersed in a thermoplastic resin is important in order to achieve acceptable durability of the resulting composition, particularly where such compositions are intended to be used as innerliners in pneumatic tires. EP 0 969 039 A1 also discloses that, in attempting to fabricate a thermoplastic elastomer composition having sufficient flexibility, strength and elongation, as well as superior durability for use as an innerliner for pneumatic tires, by increasing the amount of rubber in the composition and keeping the ratio of melt viscosities of the rubber/resin at 1, the rubber becomes the principal matrix of the composition and the composition no longer exhibits thermoplasticity.

U.S. Patent Application Publication No. 2006/0293457 discloses a method for preparing a thermoplastic vulcanizate comprising: a) melt processing a blend of thermoplastic polymer and vulcanizable elastomer in a multi-screw extruder having at least three intermeshing screws; b) adding at least one curing agent to the melt-processed blend of a) in at least one location in the first 46% of the length of said extruder, or adding at least one curing agent to the melt-processed blend of a) in a second extruder, so as to initiate curing of the blend; and, curing at least partially said elastomer by reactive melt processing.

The manufacturing process by which the DVA is produced has a significant impact on the morphology of the DVA, and thus impacts the properties of the DVA. In particular, the DVA's low temperature durability is dependent not only on the composition but also on the morphology of the final product. Therefore, there is a continued need for improved processes for preparing DVAs that allow for similar or improved morphologies and properties of the DVAs than that which are currently achieved during conventional processes.

SUMMARY OF THE INVENTION

The present invention is directed to a process for preparing a dynamically vulcanized alloy ("DVA") comprising a thermoplastic resin and an elastomer. Preferably the elastomer is a low-permeability rubber, such as an isobutylene-containing elastomer, and most preferably the elastomer is halogenated. In the process, the elastomer, and the thermoplastic resin will be fed into a mixer where the mixture can be dynamically vulcanized. The DVA has improved low temperature fatigue resistance which reduces the potential of cracking of the alloy under repeated cyclic stress at relatively lower operating temperatures. These properties may be affected by the processing of the DVA, and processing methods are disclosed to obtain a DVA with improved low temperature fatigue properties.

In one aspect, the invention provides a method for producing a dynamically vulcanized alloy, wherein at least one thermoplastic resin and at least one plasticizer are mixed in a first melt processing device to form a resin masterbatch, and at least one elastomer, at least one curative, and said resin masterbatch are mixed in a second melt processing device under shear conditions.

These and other features, aspects, and advantages of the present invention will become better understood with regard to the following description and appended claims.

DETAILED DESCRIPTION OF THE INVENTION

Figure 1:
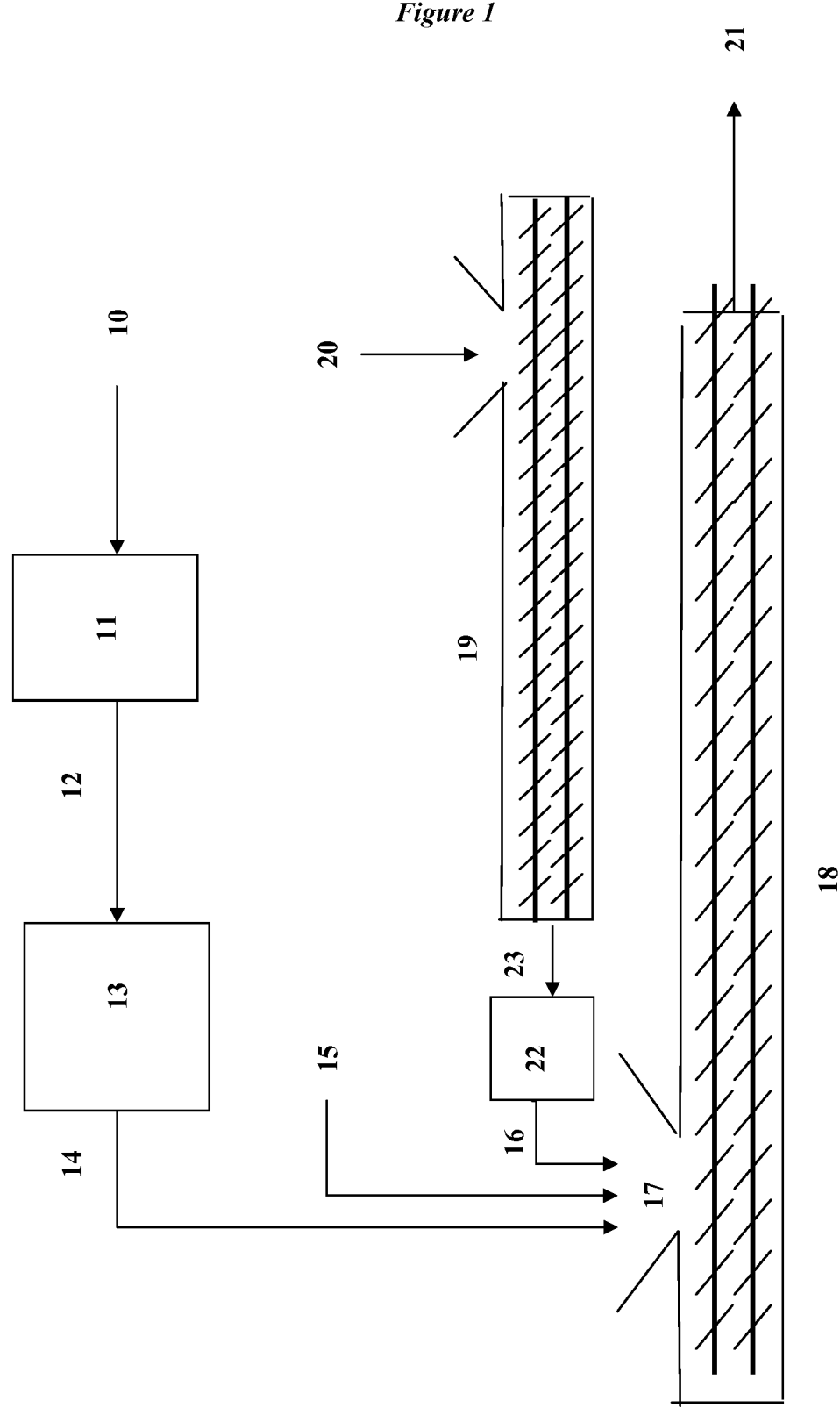
FIG. 1 is a schematic illustration of a process for manufacturing dynamically vulcanized alloys wherein a rubber master batch and rubber granulator are used.

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The term "dynamic vulcanization" is used herein to connote a vulcanization process in which a thermoplastic resin and a vulcanizable elastomer are vulcanized under conditions of high shear. As a result of the shear mixing, the vulcanizable elastomer is simultaneously crosslinked and dispersed as fine particles of a "micro gel" within the thermoplastic resin, creating a dynamically vulcanized alloy ("DVA").

Dynamic vulcanization is effected by mixing the ingredients at a temperature which is at or above the curing temperature of the elastomer. Mixers used in the mixing process may include, but are not limited to, equipment such as roll mills, Banbury™ mixers, continuous mixers, kneaders, or mixing extruders, e.g., twin screw extruders. The unique characteristic of the DVA is that, notwithstanding the fact that the elastomer component may be fully cured, the DVA can be processed and reprocessed by conventional rubber processing techniques such as extrusion, injection molding, compression molding, etc. Scrap or flashing can be salvaged and reprocessed.

The DVA has a morphology wherein the elastomer is uniformly dispersed as fine particles within the thermoplastic resin. The thermoplastic resin component forms the continuous phase and the elastomer is the dispersed phase even where the rubber to resin ratio is 1.0 or more. The dispersed particle size of the elastomer and the structure of the resin phase are controlled to improve the durability of the DVA, in particular durability at low temperatures.

Preferably the dynamically vulcanized alloy is produced by the mixing of at least one thermoplastic resin and at least one plasticizer in a first melt processing device to form a resin masterbatch; and mixing at least one elastomer, at least one curative, and said resin masterbatch in a second melt processing device under shear conditions.

In a preferred embodiment, the dynamically vulcanized alloy comprises at least one halogenated isobutylene-containing elastomer and at least one thermoplastic resin, and is produced by mixing said thermoplastic resin and at least one plasticizer in a multi-screw extruder to form a resin masterbatch; feeding said elastomer, at least one curative, and said resin masterbatch into the feed throat of a second multi-screw extruder; mixing said contents of the second multi-screw extruder under dynamic vulcanization conditions of temperature and shear to form a dynamically vulcanized alloy, wherein the elastomer is present as a dispersed phase of small vulcanized or partially vulcanized particles in a continuous phase of the thermoplastic resin.

Thermoplastic Resin

As used herein, the term "thermoplastic resin" means a material which generally softens, or melts, when exposed to high temperatures and returns to its original condition when cooled to a lower, or room temperature. For purposes of this invention, a thermoplastic resin is distinct from a thermoset or elastomeric material which solidifies via cross-linking or curing when subjected to heat.

Suitable thermoplastic resins for use in the DVA include resins selected from the group consisting of polyamides, polyimides, polycarbonates, polyesters, polysulfones, polylactones, polyacetals, acrylonitrile-butadiene-styrene resins ("ABS"), polyphenyleneoxide ("PPO"), polyphenylene sulfide ("PPS"), polystyrene, styrene-acrylonitrile resins ("SAN"), styrene maleic anhydride resins ("SMA"), aromatic polyketones (e.g., "PEEK", "PED", and "PEKK"), and mixtures thereof.

Suitable thermoplastic polyamides (nylons) comprise crystalline or resinous, high molecular weight solid polymers including copolymers and terpolymers having recurring amide units within the polymer chain. Both fiber-forming and molding grade nylons are suitable. Examples of such polyamides are polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), polyhexamethyleneisophthalamide (nylon-6, IP), nylon 6,66 copolymer, and the condensation product of 11-amino-undecanoic acid (nylon-11).

Suitable thermoplastic polyesters which may be employed include the polymer reaction products of one or a mixture of aliphatic or aromatic polycarboxylic acids esters of anhydrides and one or a mixture of diols. Preferred polyesters are derived from aromatic dicarboxylic acids such as naphthalene or phthalic acids and $C_2$ to $C_4$ diols, such as polyethylene terephthalate and polybutylene terephthalate. Preferred polyesters will have a melting point in the range of 160° C. to 260° C.

Suitable thermoplastic resins have a melting point of at least 150° C. In one embodiment, the resin has a melting point in the range of from about 150° to about 250° C.

Elastomers

The elastomeric component of the DVA may be selected from an assortment of thermosetting, elastomeric materials. For uses where impermeability of the final article to be produced is desired, the use of at least one low-permeability elastomer is desired. Suitable low-permeability elastomers are isobutylene containing elastomers such as butyl rubber, halogenated butyl rubber, star branched butyl rubber, halogenated star branched butyl rubber, poly(isobutylene-co-alkylstyrene), halogenated poly(isobutylene-co-alkylstyrene), and isobutylene—isoprene—alkylstyrene terpolymers.

Suitable halogenated isobutylene elastomer components include copolymers (such as brominated isobutylene-paramethylstyrene copolymers) having a number average molecular weight Mn of at least about 25,000, preferably at least about 50,000, preferably at least about 75,000, preferably at least about 100,000, preferably at least about 150,000. The copolymers may also have a ratio of weight average molecular weight (Mw) to number average molecular weight (Mn), i.e., Mw/Mn of less than about 6, preferably less than about 4, more preferably less than about 2.5, most preferably less than about 2.0. In another embodiment, suitable halogenated isobutylene elastomer components include copolymers (such as brominated isobutylene-paramethylstyrene copolymers) having a Mooney viscosity (1+4) at 125° C. (as measured by ASTM D 1646-99) of 25 or more, preferably 30 or more, or more preferably 40 or more.

Preferred elastomers include copolymers of isobutylene and para-alkylstyrene, which may or may not be halogenated. Preferably the copolymer of isobutylene and para-alkylstyrene is halogenated. Such elastomers are described in European Patent Application 0 344 021, herein incorporated by reference. The copolymers preferably have a substantially homogeneous compositional distribution. Preferred alkyl groups for the para-alkylstyrene moiety include alkyl groups having from 1 to 5 carbon atoms, primary haloalkyl, secondary haloalkyl having from 1 to 5 carbon atoms and mixtures thereof. A preferred copolymer comprises isobutylene and para-methylstyrene. Preferred brominated copolymers of isobutylene and para-methylstyrene include those having 5 to 12 weight % para-methylstyrene, 0.3 to 1.8 mol % brominated para-methylstyrene, and a Mooney viscosity of 30 to 65 (1+4) at 125° C. (as measured by ASTM D 1646-99).

Such halogenated isobutylene elastomer copolymers may be prepared from isobutylene and about 0.5 to 25% by weight, preferably about 2 to 20% by weight, based upon the total amount of the comonomers, of p-alkylstyrene, preferably p-methylstyrene, followed by halogenation. The content of the halogen (e.g., Br and/or Cl, preferably Br) is preferably less than about 10% by weight, more preferably about 0.1 to about 7% by weight, based upon the total amount of the copolymer.

The elastomer composition according to the present invention may contain, in addition to the above-mentioned essential ingredients, a vulcanization or cross-linking agent, or a vulcanization or cross-linking accelerator. The amounts of these additives added may be conventional amounts so long as they do not run counter to the object of the present invention.

The relative weight ratio for the thermoplastic resin to the elastomer in the DVA is in the range of 5/95 to 75/25 in one embodiment, and 10/90 to 75/25 in another embodiment. The ratios are presumptive of the fact that the total amount of the thermoplastic resin and elastomer is 100 parts by weight.

In the dynamically vulcanized alloy, the thermoplastic resin is present in an amount ranging from about 10 to 98 wt % based on the alloy blend, and from about 20 to 95 wt % in another embodiment. In yet another embodiment, the thermoplastic resin is present in an amount ranging from 35 to 90 wt %. The amount of elastomer in the DVA is in an amount ranging from about 2 to 90 wt % based on the alloy blend, and from about 5 to 80 wt % in another embodiment. In yet another embodiment, the elastomer is present in an amount ranging from 10 to 65 wt %.

Secondary Elastomer

In some embodiments, the DVA may further comprise a secondary elastomer. The secondary elastomer may be any elastomer, but preferably the secondary elastomer is not an isobutylene-containing elastomer. An example of a preferred secondary elastomer is a maleic anhydride-modified copolymer. Preferably, the secondary elastomer is a copolymer comprising maleic anhydride and ester functionalities such as maleic anhydride-modified ethylene-ethyl acrylate.

The secondary elastomer may be added to the DVA processing extruder simultaneously with the elastomer and the thermoplastic resin masterbatch. Alternatively, it may be added to the DVA either prior to or after the elastomer and the thermoplastic resin masterbatch have entered the DVA processing extruder.

The amount of the secondary elastomer in the DVA may be in the range of from about 2 wt % to about 45 wt %. If the DVA comprises at least one elastomer and a secondary elastomer, the total amount of both the elastomer and secondary elastomer is preferably in the range of from about 2 wt % to about 90 wt %.

DVA Mixing

The method for producing the DVA comprises mixing the elastomer and the thermoplastic resin. Preferably the mixing is performed by a melt processing device, such as by a screw extruder. Any melt processing device can be used in the process that is capable of processing and mixing the cross-linkable elastomer, oil, thermoplastic resin, cure agents, and catalyst and can generate high enough temperature and shear for cure. Examples of suitable melt processing devices include, but are not limited to, buss-co kneader, planetary extruder, co- or counter rotating multi-screw screw extruders, with two or more screw tips, co-rotating intermixing extruder with two or more screws, ring extruder. The term screw tips refers to the leading edge of the flights of the extruder screws. One or more pieces of processing equipment can be used, either in tandem or series, preferably tandem. Preferably, melt-blending takes place with materials being in the melted or molten state. The materials may be in a molten state when entering the melt processing device. The melt processing device may or may not be used to melt the materials before they are mixed.

In a preferred embodiment, a twin screw extruder ("TSE") is used. Preferably, the screws are intermeshing and co-rotating. A commercial example of a suitable TSE is of the type 3 screw tips (ZSK 83) diameter 83 mm, L/D 46, from Coperion Co.

In a continuous process, the materials may be mixed and melted in an extruder for dynamic curing, or mixed and melted in one extruder and passed to another extruder as a melt, or as a pellet if pelletized between extruders, for further dynamic curing. Also, the mixing of polymeric components with or without curing agents may be carried in one or more of melt compounders and then the curing is carried out in one or more extruders.

To achieve the desired mixing, two or more types of extruders may be used for successive kneading/mixing of the components. One of the control conditions for the extrusion mixing is specific energy, which is equivalent to the overall energy supplied to the extruder per the mass passing through the extruder. The amount of overall energy supplied to the material may be affected by the melt temperature in the extruder, the amount of energy required to the rotate the extruder blocks in the extruder, the amount of mass moving through the extruder, and the speed of the mass moving through the extruder. For example, if a small volume of mass having a low viscosity and a low melt temperature is moved through an extruder, not much energy is required to move the material through the extruder. Conventional conditions for dynamic mixing of the elastomer and the thermoplastic resin components generally requires a specific energy of around 0.35 kw-hr/kg or higher.

During the dynamic vulcanization process, several key competing reactions/mechanisms occur. The first is the reaction between the thermoplastic resin and the elastomer. For example, a component of the thermoplastic, such as the amine group when polyamide is the thermoplastic, may react with the pendant halogen of the halogenated elastomer. This interfacial grafting reaction results in a high viscoelastomer copolymer. This reaction also allows the elastomer to be finely dispersed in the thermoplastic resin. Meanwhile, physical mechanisms occur due to the shear mixing, an erosion phenomenon and other conventional drop breakup mechanism such as capillary drop break-up. The edge portions of any large rubber particles which are grafted with the thermoplastic resin are pulled away from the main rubber particle body during the shear mixing and elongation flowing of the copolymer. If the DVA is heated too much due to excessive energy or temperature applied to the system, cross-linking of the elastomer may actually slow down the erosion phenomenon and other conventional drop breakup mechanisms, and reduce the ability of the elastomer to be finely dispersed within the DVA.

The interfacial grafting reaction and the shear mixing allow for a DVA having a fine dispersion of elastomer as small particles in the continuous nylon phase. In the processing of the DVA, especially those blends containing a majority of elastomer, in the early stages of mixing, as the two ingredients (i.e., the elastomer and the thermoplastic resin) are melted together, the lower softening-temperature elastomer and the thermoplastic resin form a co-continuous morphology. As the interfacial grafting reaction occurs the interfacial tension is lowered, allowing for a reduction of the elastomer phase as the two phases become compatible. As the elastomer phase is dispersed it becomes a discontinuous phase dispersed in the continuous phase of thermoplastic resin.

Further, various compounding agents such as fillers, various types of oils, anti-aging agents, reinforcing agents, plasticizers, softening agent, or other various additives (except vulcanization agents) that are generally mixed into elastomers may be added during the above kneading, or they may be mixed in advance into the elastomer alone prior to kneading of the combined elastomer and thermoplastic resin.

After the DVA has been fabricated, i.e. mixed to form the alloy, it may be further processed and formed into pellets or other desired article or shape.

The process by which the DVA is produced impacts the morphology of the DVA. Preferably the inventive processes maintains, or not appreciably impairs, or improves the morphology of the DVA that is achieved during conventional mixing processes. The morphology of the DVA can be determined by particular properties of the DVA, including capillary viscosity and extrusion surface roughness, or by analytical tools such as atomic force microscopy.

The capillary viscosity of the DVA is measured on a Laboratory Capillary Rheometer ("LCR"), according to a modified ASTM D-3835-02 test. The test modification is that the test is run at 220° C., with measurements taken at $1200\,s^{-1}$. An increase in the capillary viscosity indicates a decrease in viscosity degradation that can occur during shear mixing. Preferably, the DVA has an average LCR viscosity of at least 300 Pa-sec. In one embodiment, the LCR viscosity in the range of from about 200 Pa-sec to about 350 Pa-sec, or in the range of from about 215 Pa-sec to about 300 Pa-sec.

The extrusion surface roughness ("ESR") is a measure of the surface smoothness of the DVA, with lower numbers indicating a smoother surface. The ESR is measured using a Surfanalizer, supplied by Federal, and measured in accordance with the manufacturer's instructions for operation. Lower numbers are also indicative of the elastomer phase being more uniformly and well-dispersed within the continuous thermoplastic resin phase. The ESR is a particularly important extrusion property as it may dictate the performance of the DVA in the final product in end-use applications. Preferably, the DVA has an ESR value not greater than 80. In one embodiment, the ESR value is in the range of from about 20 to about 70. In another embodiment, the ESR value of the DVA is in the range of about 30 to about 60.

The conventional DVA fabrication process is a multiple-step process. The DVA is produced by first premixing (i) a rubber master batch that comprises a rubber component and the necessary curatives; and (ii) a resin master batch comprising a thermoplastic resin and plasticizers.

Conventionally, the rubber master batch is made by mixing the elastomer component and the cross-linking agent until a uniform mixed state is obtained. This mixing occurs at a temperature below the cross-linking temperature. A general kneader, Banbury mixer, etc., may be used to mix the elastomer component and the cross-linking agent. At this time, suitable amounts of fillers such as carbon, oil, calcium carbonate, etc., may also be added to the rubber master batch. During the mixing, if the temperature of the material becomes too high, the elastomer will begin to cross-link in the mixer, thus, the temperature must be kept below the cross-linking temperature for the reaction, typically not more than 120° C. Typically, the rubber masterbatch is then further processed in a granulator to granulate the masterbatch into smaller granular for mixing with the resin masterbatch.

The resin masterbatch is mixed, typically in a twin screw extruder, by mixing the resin and plasticizers. The resin masterbatch may then be pelletized. The pelletized resin masterbatch may be immediately used, or may be stored and used at a later time. The rubber master batch, resin master batch, and all remaining components are then fed into a mixer, such as an extruder, preferably by way of the extruder feed throat. A secondary elastomer, such as maleic anhydride-modified ethylene ethyl acrylate, may also be added to the DVA either prior to or after the rubber master batch and the resin master batch have entered the extruder. The elastomer component is dynamically vulcanized, during the melt mixing causing the elastomer component to disperse as a discontinuous phase in the continuous thermoplastic resin phase. The temperature for the melt mixing should be at least the temperature at which the thermoplastic resin melts. The shear rate at the time of mixing is typically from 500 to $7500\,\mathrm{sec}^{-1}$. The overall time of the mixing is typically from 30 seconds to 10 minutes.

An example of the conventional process to produce a DVA is illustrated in FIG. 1. The elastomer and curatives enter a mixing device 11 by conduit 10 where they are intimately mixed to form a rubber masterbatch. Other conventional additives may also be mixed into the rubber masterbatch. The rubber masterbatch exits the mixing device 11 through conduit 12 and enters a rubber granulator 13. The rubber granulator 13 granulates the rubber masterbatch into smaller granular which exit the rubber granulator 13 through conduit 14. A resin masterbatch is mixed in the extruder 19. The thermoplastic resin enters the extruder 19 at the feed throat 20. Plasticizers and other additives may be added into the resin masterbatch at the feed throat 20 or along any entry ports of the extruder 19. The resin masterbatch then exits the extruder 19 through conduit 23 and enters a pelletizer 22. The pelletized resin masterbatch then exits the pelletizer 22 via conduit 16. The pellets may then enter the DVA processing extruder 18 via the feed throat 17. The resin masterbatch 16, rubber masterbatch 14, and any other additives 15, such as secondary elastomers, are then dynamically vulcanized in extruder 18, they are typically added to the extruder 18 through feed throat 17. The DVA then exits the extruder 18 through conduit 21.

It was believed that the rubber masterbatching step was needed in order to fully disperse the curative in the elastomer. By intimately mixing the elastomer and the curative to form a rubber masterbatch, it was believed that there would be a better dispersed curative, thus allowing for better control of the cure rate of the elastomer. It was believed that this permitted a different reaction between the ingredients whereby a more desirable and uniform system was obtained which would function more effectively in the final DVA combination with the remainder of thermoplastic resin.

The conventional process to produce a DVA requires several sequential and parallel mixing operations. It was believed that the two-stage mixing operation was necessary to obtain the desired morphology in the final DVA product. The pre-mixing of the rubber masterbatch served principally to effect homogenous blending of the elastomer with the curative and the dynamic mixing of the rubber masterbatch with the resin masterbatch served principally to effect reduction in particle size of the dispersed phase material.

In the inventive process, the DVA is produced by the mixing of at least one thermoplastic resin and at least one plasticizer in a first melt processing device to form a resin masterbatch; and then mixing at least one elastomer, at least one curative, and said resin masterbatch in a second melt processing device under dynamic vulcanization conditions of temperature and shear. Preferably, in the inventive process there is no rubber masterbatching step, and the elastomer and curatives are added directly to the DVA melt processing device without any prior mixing. Eliminating the rubber masterbatching step may allow for savings in the cost of producing the DVA, as it may require less equipment and time to produce the DVA.

In a preferred embodiment, the dynamically vulcanized alloy comprises at least one halogenated isobutylene-containing elastomer and at least one thermoplastic resin. The DVA is produced by mixing the thermoplastic resin and plasticizer in a first melt processing device to form a resin masterbatch. Preferably the first melt-processing device is a multi-screw extruder, such as a twin screw extruder. Any suitable plasticizer known in the art may be used. Preferably, the plasticizer causes the thermoplastic resin to swell/expand. A preferred plasticizer is n-butylbenzene sulfonamide. An example of a suitable commercially available plasticizer is Uniplex 214, which is available from Unitex. Optionally, the resin masterbatch may then be pelletized. If the resin masterbatch is pelletized, the pellets may be added directly to the feed throat of a second melt-processing device or they may be stored and used at a later time.

The elastomer, at least one curative, and the resin masterbatch are then fed into the feed throat of a second melt-processing device. Optionally, a secondary elastomer may be fed into the feed throat of the second melt-processing device. The contents of the second-melt processing device are then mixed under dynamic vulcanization conditions of temperature and shear to form a dynamically vulcanized alloy, wherein the elastomer is present as a dispersed phase of small vulcanized or partially vulcanized particles in a continuous phase of the thermoplastic resin. Preferably the second melt-processing device is a multi-screw extruder, such as a twin screw extruder.

Preferably, the dynamic vulcanization conditions are of such a temperature and shear so as to cause the elastomer component to disperse as a discontinuous phase in the continuous thermoplastic resin phase. The temperature for the melt mixing should be at least the temperature at which the thermoplastic resin melts. The shear rate at the time of mixing is typically from 500 to 7500 $\sec^{-1}$. The overall time of the mixing is typically from 30 seconds to 10 minutes.

Figure 2:
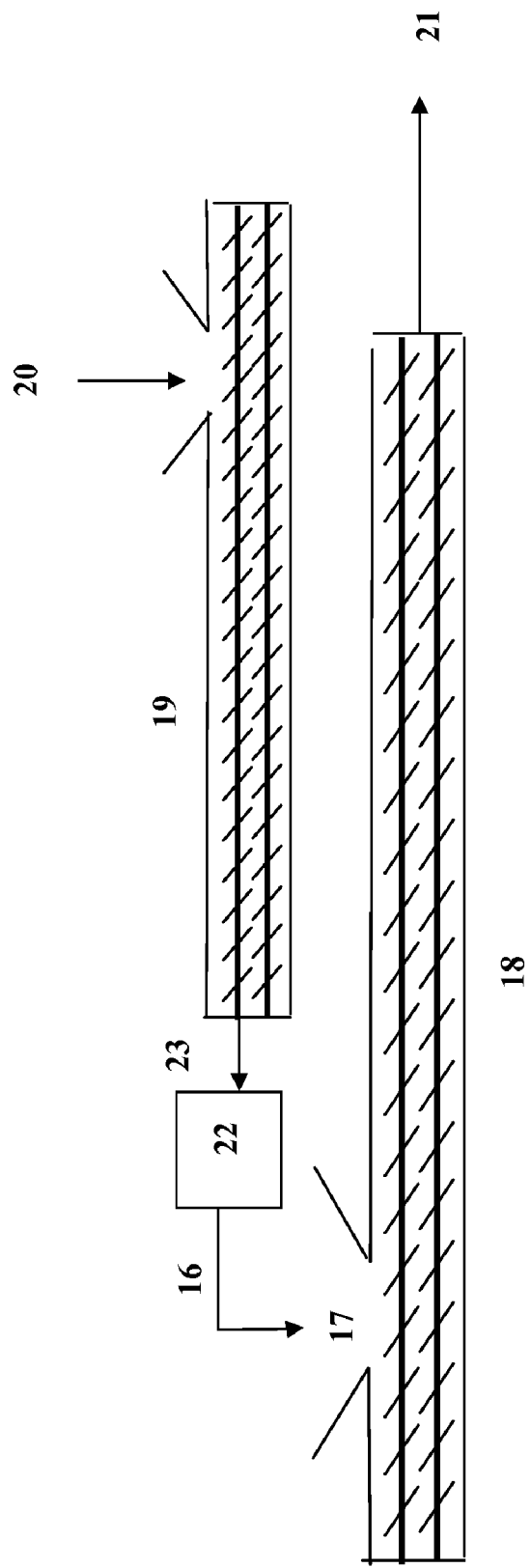
FIG. 2 is a schematic illustration of one embodiment of the inventive process for manufacturing dynamically vulcanized alloys.

An embodiment of the invention will now be more particularly described with reference to FIG. 2. A resin masterbatch is mixed in a first twin-screw extruder ("TSE") 19. The resin enters the first TSE 19 through feed throat 20. Conventional additives, such as a plasticizer, may enter the first TSE 19 through feed throat 20 or alternatively may be added through any side injection ports along the length of the first TSE 19. The resin masterbatch exits the first TSE 19 through conduit 23 and enters a pelletizer 22. The pelletized resin masterbatch then exits the pelletizer 22 via conduit 16. The pellets 16 may then enter enters the DVA processing extruder 18 through feed throat 17. The elastomer, curatives, and any secondary elastomer, such as maleic anhydride-modified ethylene ethyl acrylate, or any other additives, enter the DVA processing extruder 18 through feed throat 17. Preferably, the DVA processing extruder is a twin-screw extruder. Alternatively, the additives may be added through side injection ports along the length of the DVA processing extruder 18. The elastomer and curatives are directly added to the DVA processing extruder without any prior pre-mixing. The elastomer, curatives, resin masterbatch, and any additives, are then dynamically vulcanized by shear mixing in the DVA processing extruder 18. The final DVA product exits the DVA processing extruder 18 through conduit 21.

While the illustrative embodiments have been described with particularity, it will be understood that various other modifications will be apparent to and can be readily made by those skilled in the art without departing from the spirit and scope of the invention. To the extent that this description is specific, it is solely for the purposes of illustrating certain embodiments of the invention and should not be taken as limiting the present inventive concepts to these specific embodiments. Accordingly, it in not intended that the scope of the claims appended hereto be limited to the examples and descriptions set forth herein but rather that the claims should be construed as encompassing all the features of patentable novelty which reside in the present invention, including all features which would be treated as equivalents thereof by those skilled in the art to which the invention pertains.

EXAMPLES

The inventive process for manufacturing DVAs will now be further described with reference to the following non-limiting examples.

When possible, standard ASTM tests were used to determine the DVA's physical properties. Table 1 summarizes the testing procedures used in the Examples.

The ultimate elongation ("UE") of the DVA was measured in accordance with ASTM D412. The UE indicates the distance a strand of the material can be stretched before it breaks.

The M100 test measures the modulus of the material and indicates the resistance to strain at 100% extension in force per unit area.

The weight gain percentage test ("WtGain %") is a measurement of the amount of oil absorbed by the sample in an oil swell resistance test. The test is based on ASTM D471 and ISO 1817. A sample of the DVA is immersed in IRM 903 oil for 24 hours at 121° C. The WtGain % is an indirect measure of the completeness of the cross-linking (cross-linking density) of the DVA. Although weight gain values can depend on whether or not the elastomer is oil-extended, and how much, in DVAs having the same composition, the values show the amount of cross-linking of the DVAs relative to each other.

Tension set ("TensSet") is a measure of the permanent deformation of the DVA when it is stretched. A test specimen of dimensions 50.8 mm (2 in.) long, 2.54 mm (0.1 in) wide, and 2.03 mm (0.08 in) thick is cut form an injection molded plaque and is stretched to 100% and held for 10 minutes at 23° C. The specimen is then allowed to relax at 23° C. for 10 minutes. The change in the length of the original specimen is measured and the TensSet is calculated according to the formula:

$$TnSet\% = ((L_1 - L_0)/L_0) \times 100$$

where $L_0$ is the original length and $L_1$ is the final length.

The capillary viscosity of the DVA is measured on a Laboratory Capillary Rheometer ("LCR"), according to a modified ASTM D-3835-02 test. The test modification is that the test is run at 220° C. with measurements taken at 1200 $s^{-1}$. An increase in the capillary viscosity indicates a decrease in viscosity degradation that can occur during shear mixing.

ESR is a measure of the surface smoothness of the DVA, where lower numbers indicate a smoother surface. The ESR is measured using a Surfanalizer, supplied by Federal, and measured in accordance with the manufacturer's instructions for operation. Lower numbers are also indicative of the elastomer phase being more uniformly and well-dispersed within the continuous thermoplastic resin phase. It is a particularly important extrusion property as the ESR may dictate the performance of the DVA in the final product in end-use applications.

Equivalent Rubber Diameter is a measure of the elastomer particles in the DVA. The number of particles in a 30 micron× 30 micron cross-section of a DVA sample are counted as observed with atomic force microscopy. The particle aspect is the ratio between the major axis and the minor axis of the elastomer particles. The particle equivalent is then the Feret Diameter, which is the caliper length along the major axis of the particles.

TABLE 1

Test Methods

| Parameter | Units | Test |
|---|---|---|
| Ultimate tensile strength ("UTS") | [psi] | ASTM D412 (ISO 37 type 2) |
| UE | [%] | ASTM D412 (ISO 37 type 2) |
| M 100 | [psi] | ASTM D412 (ISO 37 type 2) |
| WtGain | [%] | See text. |
| LCR | [Pa · s] | See text. |
| ESR | [Ra] | See text. |
| TensSet | [%] | See text. |
| Equiv Rubber Diameter-average (nm) | | See text. |

A listing of various components used in the DVA of the examples is in Table 2.

TABLE 2

Various Components in the DVA

| Material | Brief Description | Commercial Source |
|---|---|---|
| UBE 5033B | Nylon 6/66 | UBE |
| Uniplex 214 | n-butylbenzene sulfonamide Plasticizer | Unitex |
| Irganox 1098 | Antioxidant | Ciba |
| Tinuvin 622LD | Antioxidant | Ciba |
| Copper Iodide | Antioxidant | Sigma-Aldrich |
| Exxpro 98-4 | Brominated copolymer of isobutylene and para-methylstyrene. | ExxonMobil Chemical Company |
| Kadox 911 | Zinc Oxide Curative | Zinc Corp. |
| Stearic Acid F1000 | Stearic Fatty Acid | Harwick |
| ZnSt | Zinc Stearate D | Witco Chemtura/Crompton |
| SG2000 | Talc | Nippon |
| AR201 | MAH-g-EEA (maleic anhydride-modified ethylene ethyl acrylate) | Mitsui-DuPont Chemicals Co., Ltd |

The same DVA formulation was used for all of the examples, with the difference being in the process for preparing the samples. The DVA composition contained 49.12 wt % of a halogenated copolymer of isobutylene and para-alkylstyrene, 30.93 wt % nylon 6,66, 13.26 wt % of n-butylbenzene sulfonamide (a plasticizer), with the remaining components of the composition being curatives, and other conventional additives. The formulations for the samples are provided in Table 3.

TABLE 3

DVA Formulation

| Ingredient | PHR | Wt % |
|---|---|---|
| Exxpro 89-4 | 100.00 | 49.01 |
| Stearic Acid F100 | 0.60 | 0.29 |
| Zinc Stearate D | 0.30 | 0.15 |
| Zinc Oxide Kadox 911 | 0.15 | 0.07 |
| SG2000 Talc | 2.50 | 1.23 |
| AR201 | 10.05 | 4.93 |
| Nylon 6, 66 (UBE 5033B) | 63.07 | 30.91 |
| Uniplex 214 (Pasticizer) | 27.04 | 13.25 |
| Irganox 1098 | 0.22 | 0.11 |
| Tinuvin 622 LD | 0.09 | 0.04 |
| Copper Iodide | 0.02 | 0.01 |
| Total | 204.03 PHR | 100% |

Samples A1 and A2 were prepared by a conventional process for preparing DVAs. Samples B1, B2, B3, and B4 were prepared by one embodiment of the invention. All of the DVA samples used in the example were processed using a Werner & Pfleiderer 83 mm twin screw extruder (3-lobe); the extruder having fifteen barrel sections, 46 L/D, multiple potential injection locations, and a maximum RPM of 390.

Samples A1 and A2 were prepared using the conventional process. A rubber master batch was first mixed using a batch internal mixer. The rubber master batch contained Exxpro 98-4, ZnO, stearic acid, ZnSt, and talc. After the rubber master batch was mixed it was introduced into a rubber granulator. The resin master batch was mixed using a twin screw extruder and then pelletized prior to introducing the resin master batch into the DVA processing twin screw extruder. The resin master batch contained Nylon 6/66, Uniplex 214, Irganox 1098, Tinuvin 622LD, and the copper iodide. The granulated rubber master batch, the secondary elastomer (AR201), and the pelletized resin masterbatch were then fed into the DVA processing twin screw Samples B1, B2, B3, and B4 were prepared using one embodiment of the invention. A resin master batch was prepared using the conventional process. However, no rubber master batch was made. The resin master batch, secondary elastomer, elastomer, curatives, and all remaining ingredients were added directly to the feed throat of the DVA processing twin screw extruder.

The samples were tested for various properties, the results of which are provided in Table 4.

TABLE 4

Test Results

| | A1 | A2 | B1 | B2 | B3 | B4 |
|---|---|---|---|---|---|---|
| Total Feed Rate | 150.0 | 150.1 | 150.3 | 150.1 | 149.9 | 150.3 |
| Extruder Speed (RPM) | 83.0 | 91.5 | 91.6 | 91.5 | 91.9 | 92.0 |
| Moisture | 0.051 | 0.076 | 0.067 | 0.045 | 0.107 | 0.138 |
| SG | 1.020 | 1.022 | 1.029 | 1.027 | 1.028 | 1.031 |
| UTS, psi | 2094 | 2146 | 2115 | 2098 | 1966 | 2195 |
| UE, % | 366 | 400 | 401 | 408 | 382 | 398 |
| M100, psi | 892 | 845 | 787 | 800 | 814 | 896 |
| % Wt Gain | 9.1 | 9.3 | 9.8 | 9.4 | 11.2 | 9.1 |
| LCR, 1200 1/s | 291.1 | 266.5 | | | | |
| ESR, Ra | 31 | 40 | 39 | 76 | 37 | 42 |
| Tens Set, % | | | 47.0 | 46.0 | 50.0 | 48.0 |
| LCR | 291.1 | 244.3 | 258.6 | 243.7 | 219.0 | 221.8 |
| Equiv Rubber Diameter, (nm) | | 416 | 384 | 413 | 440 | 460 |

The DVAs manufactured by the inventive process wherein there was no rubber masterbatching step, resulted in a DVA with similar or improved properties to the DVAs produced by the conventional process. Direct addition of the curative and the elastomer to the DVA processing twin screw extruder provided for a DVA with similar or improved morphologies than those produced by the conventional process. When incorporated into a tire, as either an innerliner cured/adhered to the toroidal interior of the tire or used as a separate innertube within the interior space of the tire, the tire benefits from the improved air retention, stress reduction, reduced cracking, and longer life performance of the DVA.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

What is claimed is:

1. A process for producing a dynamically vulcanized alloy, the alloy comprising at least one isobutylene-containing elastomer and at least one thermoplastic resin, the process comprising the steps of:
    a) mixing said thermoplastic resin and at least one plasticizer in a first melt processing device to form a resin masterbatch;
    b) feeding said elastomer, at least one curative, and said resin masterbatch into the feed throat of an extruder, wherein said elastomer and said curative are not premixed together prior to feeding into the extruder;
    c) mixing said contents of the extruder under dynamic vulcanization conditions to form a dynamically vulcanized alloy, wherein the elastomer is present as a dispersed phase of small vulcanized or partially vulcanized particles in a continuous phase of the thermoplastic resin.

2. The process of claim 1, wherein said elastomer is halogenated.

3. The process of claim 1, wherein the elastomer is a copolymer of an isobutylene and an alkystyrene.

4. The process of claim 1, wherein the elastomer is present in the alloy in an amount in the range of from about 2 to about 90 wt %.

5. The process of claim 1, wherein mixing the contents of the extruder yields a dynamically vulcanized alloy having an Extrusion Surface Roughness value of not greater than 80.

6. The process of claim 1, wherein mixing of the contents of the extruder yields a dynamically vulcanized alloy having a Laboratory Capillary Rheometer viscosity value in the range of from 200 to 350 Pa-sec.

7. The process of claim 1, wherein the first melt processing device is a multi-screw extruder.

8. The process of claim 1, wherein the extruder is a multi-screw extruder.

9. The process of claim 1, wherein the thermoplastic resin is selected from the group consisting of polyamides, polyimides, polycarbonates, polyesters, polysulfonates, polyactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones, and mixtures thereof.

10. The process of claim 1, wherein the thermoplastic resin is a polyamide selected from the group consisting of nylon-6, nylon-12, nylon-6,6, nylon-6,9, nylon-6,10, nylon 6,66 copolymer, nylon-11, and mixtures thereof.

11. The process of claim 1, further comprising the step of pelletizing the resin masterbatch before it is fed into the feed throat of the extruder.

12. The process of claim 1, further comprising the step of feeding a secondary elastomer into the feed throat of the extruder.

13. The process of claim 12, wherein the secondary elastomer is maleic anhydride-modified ethylene ethyl acrylate.

* * * * *